Sept. 7, 1926.
R. P. WHITE
BAIL FOR JARS
Filed Feb. 19, 1926   2 Sheets-Sheet 1
1,598,837
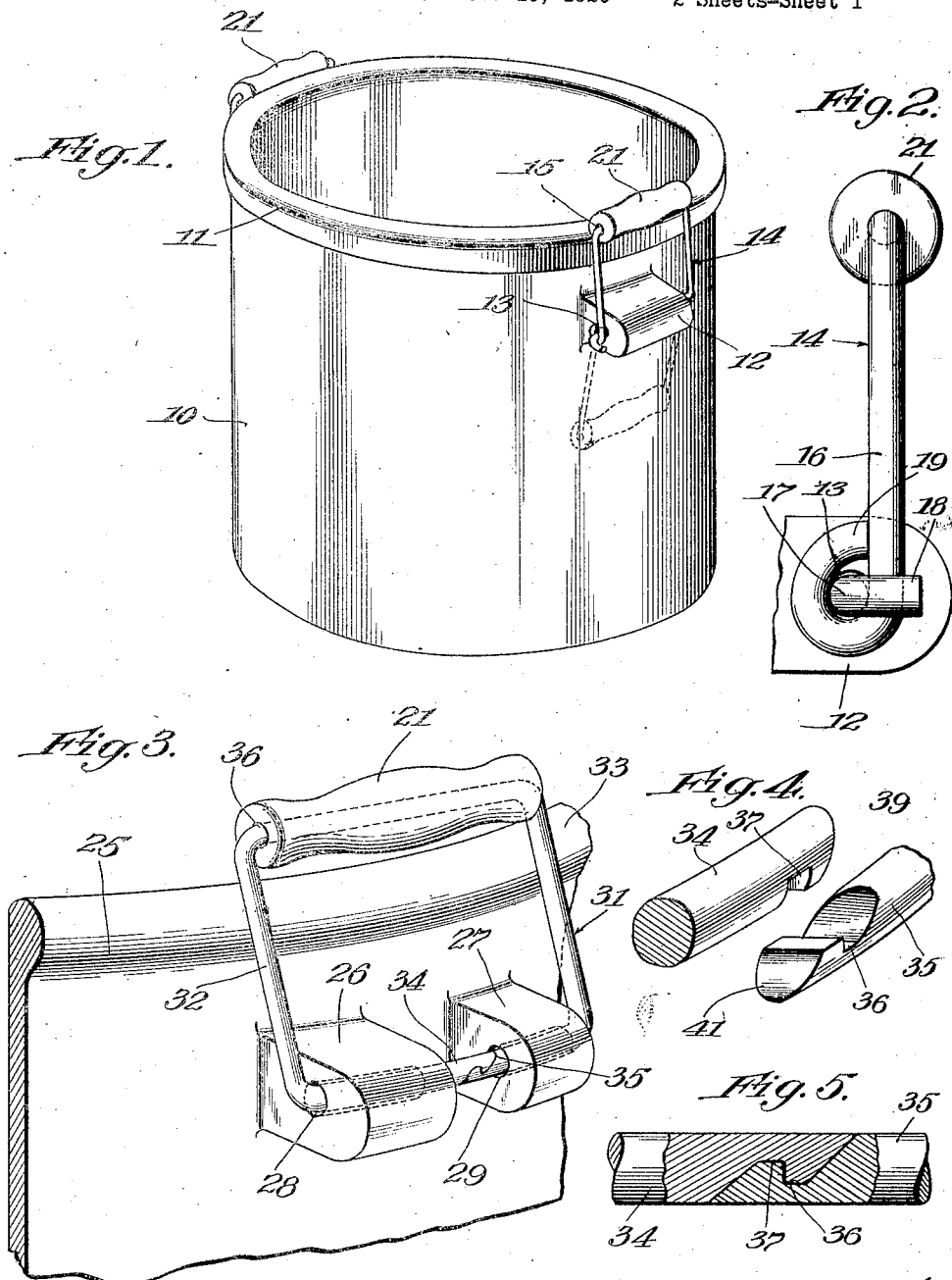
Witnesses:
Harry R. White
W. P. Kilroy
Inventor:
Richard P. White.
By Gillson, Mann & Cox
Attys Sept. 7, 1926.  
R. P. WHITE  
BAIL FOR JARS  
Filed Feb. 19, 1926  
1,598,837  
2 Sheets-Sheet 2

Witnesses:

Inventor:
Richard P. White.
By Gilson, Mann & Cox
Attys.

Patented Sept. 7, 1926.

1,598,837

UNITED STATES PATENT OFFICE.

RICHARD P. WHITE, OF CHICAGO, ILLINOIS.

BAIL FOR JARS.

Application filed February 19, 1926. Serial No. 89,302.

This invention relates to bails for jars and the like, and more particularly to bails for jars of earthen or frangible material.

One of the objects of the invention is the provision of a new and improved bail that may be made cheaply from wire and that is provided with new and improved means for holding the same in position on the jar.

Another object of the invention is the provision of a bail for jars that is cheap to manufacture, easily assembled and applied to the jar, efficient in use, occupying an unobtrusive position when not in use, and one that is light, strong and durable.

Other and further objects and advantages of the invention will appear from the following description taken in connection with the accompanying drawings, in which Fig. 1 is a perspective view of an earthen jar showing the invention in position thereon;

Fig. 2 is a side elevation of a portion of a jar with the invention in position thereon;

Fig. 3 is a perspective view of a portion of a jar showing a modified form of the device;

Fig. 4 is a detail view showing the interlocking arrangement of the ends of the bail in disconnected position;

Fig. 5 is a view similar to Fig. 4, showing the parts in interlocked position, with parts in section;

Figure 6:
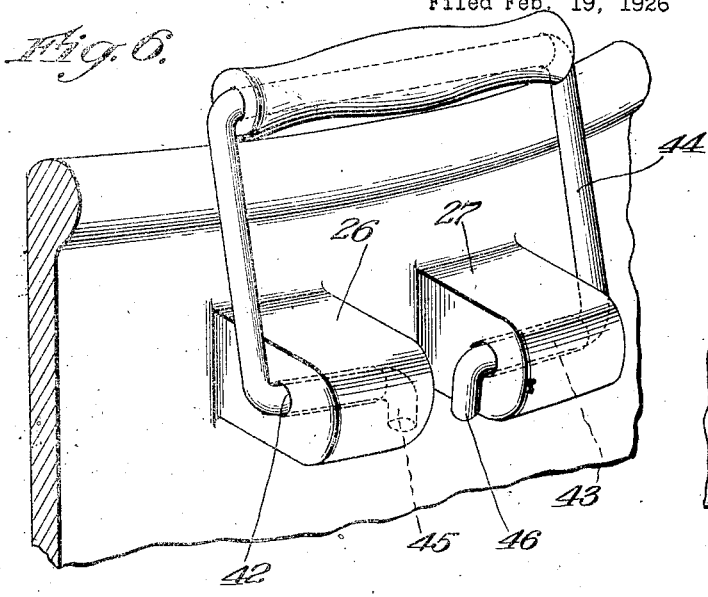
Fig. 6 is a perspective view of a portion of a jar showing a further modified form of the device.

On the drawings the reference character 10 designates a jar of earthenware, or other frangible material, having the bead 11 extending about its upper or open end, as is usual in such constructions.

In the conventional form of earthen, glass, and other frangible jars, ears or lugs are provided adjacent to the open or upper end of the jar. Due to the frangible material of which the jars are composed these ears or handholds extend outward from the surface of the jar only a very short distance, not sufficient to form a firm handhold. The material of the jars being easily broken, it is difficult to provide them (especially the larger sizes) with ears or handles large enough for conveniently handling the same without making them so large as to be not only obtrusive but readily broken off.

Owing to the low selling price of articles of this class, especially jars of earthenware, any handle, to make a commercial success, must be manufactured, assembled and attached at an extremely low cost. The handles must not only be cheaply made, but they must be strong and reliable, and unobtrusive when not in use.

In the forms of handles or bails that will now be described, wire is the chief component, and in some instances is the sole material employed.

In the form of the device selected to illustrate one embodiment of the invention, referring now to Figs. 1 and 2, the jar 10 is provided adjacent its upper or open end with ears or lugs 12 at opposite sides of the jar. Each ear is perforated, as at 13, for the reception of the bail 14, as will presently appear.

The bail 14, preferably, though not necessarily, comprises a single length of wire bent to provide a handhold 15, side or supporting members 16, and a lug-engaging portion 17. The lug-engaging portion 17 extends through the opening 13 in the ear or lug 12, and is interlocked with the other end of the wire in any suitable manner. As shown, the ends 18 and 19 of the bail 14 are bent about each other for locking them together, as clearly shown in Fig. 2.

The length of the lug-engaging portion is such that the side members 16 of the bail will be held in proximity to the ends of the lugs 12, whereby there will be no tendency to bend the lug-engaging portion 17 the force exerted on the member 17 being a shearing rather than a bending force.

The upper or handle portion 15 of the wire may, if desired, be provided with the conventional wooden handle 21.

The bails, when in use, are turned up, as shown in Figs. 1 and 2, and when not in use they are adapted to be turned to a depending position beneath the lugs where they are entirely out of the way, as indicated by dotted lines in Fig. 1.

In attaching the bails the wire is first bent to proper form, which is preferably, though not necessarily, in rectangular form, as shown, and the end of the side member 16 is curved or bent to form an eye. The end of the lug-engaging portion of the bail is left straight, and after inserting it through the lug 12 and eye in the opposite end of the bail it is bent to interlock with said eye. The end of the lug-engaging portion is so bent as to draw the side portions 16 against the lug 12, whereby the weight of the jar will not bend the lug-engaging portion of the bail. This is considered an important feature of the invention, as it permits the use of comparatively light wire for the bails.

In Fig. 3 is shown a modified form of the device which is especially adapted to be employed with jars having a pair of lugs at each side thereof, although by increasing the size of the aperture it may be used on the single lug type. As shown, the jar 25 is provided with a pair of lugs 26 and 27, having aligned apertures 28 and 29. The bail 31 preferably, though not necessarily, comprises a single length of wire having the supporting portions 32 and 33, the lug-engaging portions 34 and 35, and the handle-engaging portion 36. As shown, the wire is bent in the form of a rectangle, the ends of the wire being bent toward each other and adapted to engage the apertures 28 and 29. The ends of the lug-engaging portions 34 and 35 are interlocked, the portion 35 is provided with a notch 36, and the portion 34 with a corresponding notch 37.

If desired the engaging ends may be beveled, as at 39 and 41, whereby the two ends of the wire may be caused to interlock by forcing them toward each other. The interlocked portion is located between the lugs, whereby the ends of the wire may be sprung apart in order to cause them to interlock. If desired the bail may be provided with the usual handle 21.

The form of the device shown in Fig. 6 differs from that just described in that the ends of the lug-engaging portions 42, 43, of the bail 44 will be distorted, as shown at 45 and 46. Distortion may be accomplished by simply bending the ends sufficiently to prevent their withdrawal from the apertures in the lugs 26, 27.

Figure 7:
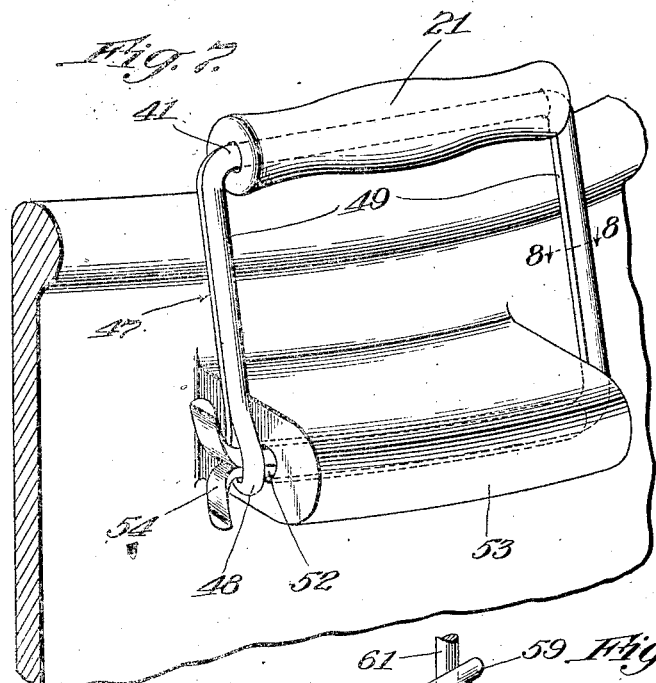
Fig. 7 is a perspective view of a portion of a jar showing a still further modified form of the device.
Figure 8:
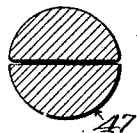
Fig. 8 is a section on line 8—8 of Fig. 7.
Figure 9:
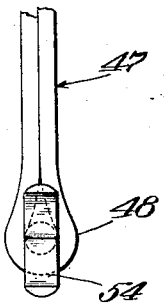
Fig. 9 is a side elevation of a portion of the bail showing the parts interlocked.

In the form of the device shown in Figs. 7, 8 and 9, the bail 47 is formed from wire semi-circular in cross section. This wire is adapted to be bent back upon itself to form the eye 48. The bail is provided with the supporting portions 49, the handle-engaging portion 41, and the lug engaging portion 52. The lug 53 may be the type shown in Fig. 1, or, if desired, it may be the type shown in Fig. 3. The lug-engaging portion of the bail is extended through the aperture in the lug 53 and through the eye 48, after which the ends may be spread, as at 54, to prevent their withdrawal from the eye 48. The bail 47 may be, and preferably is, provided with the conventional handle member 21, the same as in the form shown in Fig. 1.

Figure 10:
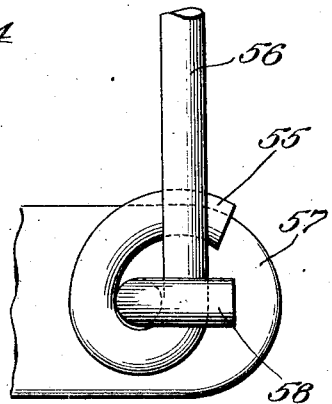
Fig. 10 is a side elevation of a portion of a jar showing the invention in position therein, with parts broken away.

In Fig. 10 is shown a modified form of interlocking connection between the ends of the bail. In this form of the device the end 55 of the side portion 56 of the bail is bent to form a closed loop or eye with the end extending between said side portion and the end of the lug 57. By means of this arrangement the end 55 is clamped between the end of the lug and the side portion 56 of the bail, whereby the increased friction will prevent the eye or loop from straightening out when the jar is lifted.

The end 58 of the bail is bent to retain the loop or eye in proximity to the end of the lug, as in the previous construction.

Figure 11:
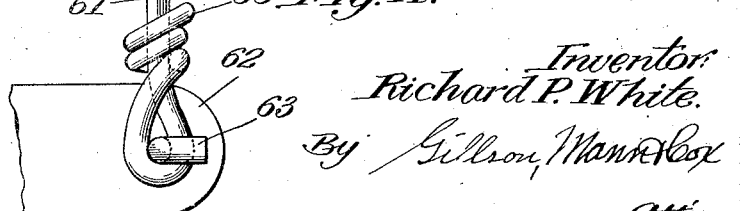
Fig. 11 is a similar view of a further modified form of the bail.

The form of the device shown in Fig. 11 differs from that shown in Fig. 10 in that the end 59 of the side portion 61 of the bail is twisted about said side portion. The opposite end of the bail, after passing through the lug or lugs 62, is bent, as at 63, for retaining said loop or eye in proximity to said lug or lugs 62.

In all forms of the device the bail-engaging portion may be, and preferably is, integral with the bail. It is, however, understood that it may be otherwise. In any event it is formed from wire, as distinguished from the more complicated constructions employing bolts and the like, the cost of which renders them prohibitive as a practical device in this art. By the use of wire the bail may be made and attached in an inexpensive manner by simply bending the wire to the proper form as required.

It is thought from the foregoing, taken in connection with the accompanying drawings, that the construction and operation of my device will be apparent to those skilled in the art, and that various changes in size, shape, proportion and details of construction may be made without departing from the spirit and scope of the appended claims.

I claim as my invention:

1. In combination, a jar having a perforated lug on its upper portion, a bail of a single length of material comprising a lug engaging portion extending through said lug, a handle portion, and side portions in proximity to the ends of said lug, the ends of said bail being interlocked.

2. In combination, a receptacle having perforated lugs at opposite sides thereof, a bail for each lug, each bail comprising a rectangular loop of wire pivoted in said lug, the ends of said wire being interlocked to hold the sides of said loop contiguous to the ends of said lug.

3. In combination, a jar having an apertured lug, a bail for said lug, said bail formed from a single length of wire doubled on itself to form an eye and having side portions, a handle portion and a lug-engaging portion, the lug-engaging portion extending through said lug and eye and having means for preventing the withdrawal of said lug-engaging portion from said eye.

4. In combination, a receptacle provided with a lug having a transverse aperture therethrough, and a single length of wire bent to form a bail with a portion thereof extending through said lug and having its ends in engagement with each other.

5. In combination, a jar having an apertured lug, a single length of wire bent to rectangular form having a portion thereof extending through said lug, the ends of said wire being interengaged, and a handle member mounted on the side of the rectangle opposite the lug-engaging portion.

In testimony whereof I affix my signature.

RICHARD P. WHITE.